United States Patent Office 2,728,753
Patented Dec. 27, 1955

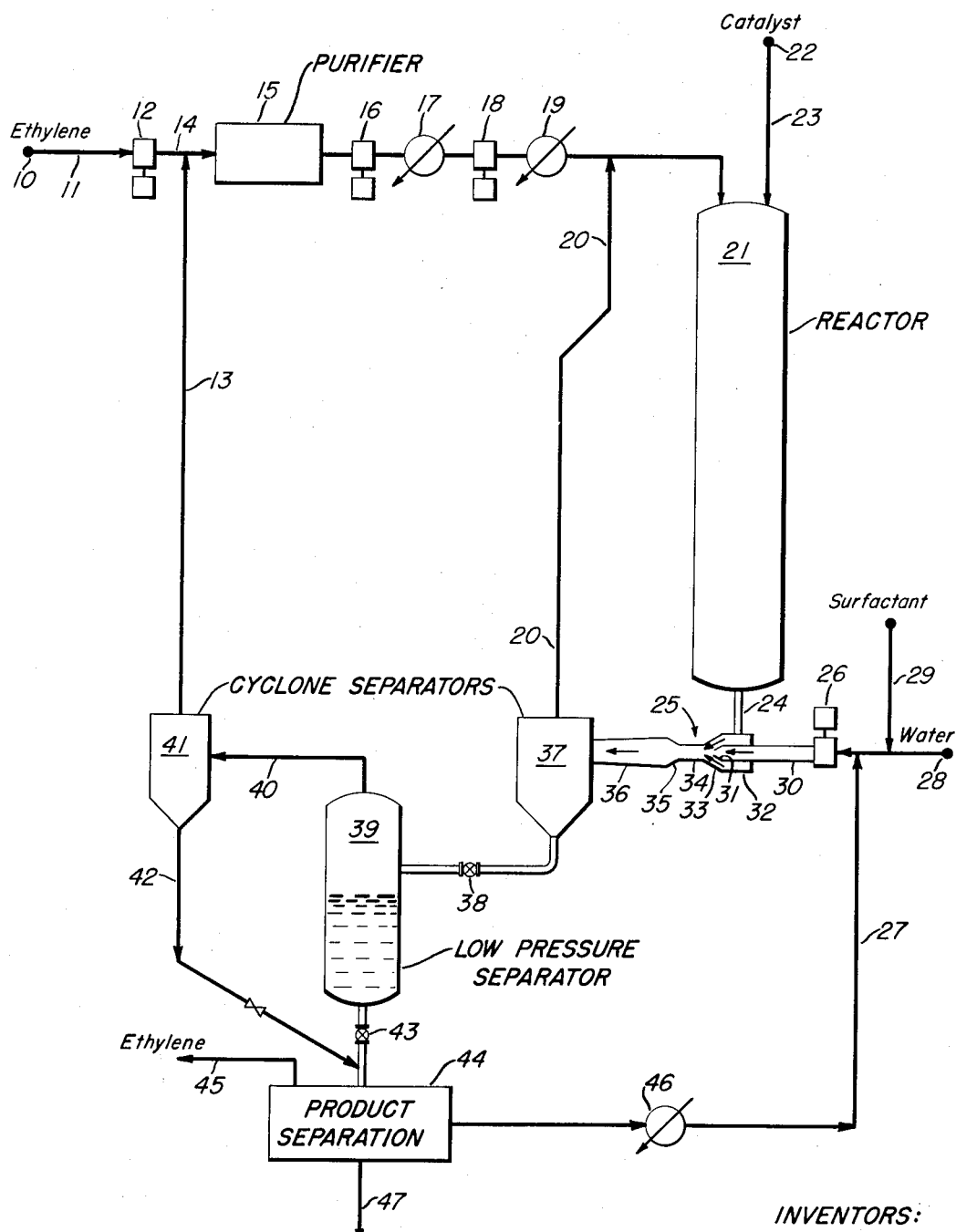

2,728,753

IMPROVED PRODUCT SEPARATION IN ETHYLENE POLYMERIZATION PROCESS

Leonard W. Russum, Highland, Ind., Robert L. Hatch, Pittsfield, Mass., and Gert H. Weisemann, Hobart, Ind., assignors to Standard Oil Company, Chicago, Ill., a corporation of Indiana Application May 16, 1952, Serial No. 288,182

10 Claims. (Cl. 260—94.9)

This invention relates to a process for polymerizing ethylene to form solid, high-molecular-weight polymers and it pertains more particularly to improved techniques for continuous product removal from a high pressure reactor wherein polymerization is effected in a continuous ethylene phase by means of a peroxy type catalyst such, for example, as a peroxy dicarbonate ester. The invention is particularly applicable to ethylene polymerization processes carried out with the catalysts, and under the conditions, taught in U. S. Patents 2,475,628, 2,475,643 and 2,475,648 but it avoids the necessity of employing aqueous films on the reactor walls and of employing surfactants or other materials in the reaction zone which might in any way have an adverse effect on the polymerization reaction.

An object of the invention is to provide an improved method and means for operating a dense ethylene phase polymerization system and for continuously removing polymer from the reactor as rapidly as it is formed. Another object is to provide an improved method and means for separating polymer from reactor effluent and recycling an unreacted ethylene stream without the necessity of employing a gas compressor for repressuring said stream. A further object is to provide a commercial process for polymerizing ethylene which will provide for increased flexibility of process variables and resultant product characteristics. Other objects will be apparent as the detailed description of the invention proceeds.

These objects are accomplished by continuously introducing ethylene into a high pressure reactor and also introducing thereto an amount of a known catalyst under known polymerization conditions to effect polymerization of part of the ethylene and to leave sufficient unpolymerized ethylene to serve as a carrier for continuously removing the polymer from the reactor; in the case of peroxy dicarbonate catalysts with a reaction temperature in the range of 55–100° C. and a pressure in the range of 4,000 to 20,000 p. s. i. g., the flow rate and catalyst addition rate should be controlled to produce an effluent product stream containing at least about .5 percent polymer but not substantially greater than 5 percent polymer. The resulting product stream, which is a viscous suspension of polymer in dense phase ethylene, is withdrawn from the reactor by impingement of a water jet introduced at a rate and velocity to increase the pressure of the reactor effluent and cause turbulent intermixing thereof with said water. The intimate contact of the water with the dense phase ethylene suspension of polyethylene results in preferential wetting of the polymer with said water whereby the polymer is transferred from the dense phase ethylene to water phase-suspended polymer. The resulting three-phase mixture of water, dense phase ethylene and polymer is then centrifugally separated, the dense ethylene phase being recycled to the reactor (by residual pressure imparted by said water jet and without requiring any compressor) while the aqueous suspension of polymer is passed to a zone of lower pressure for removing additional amounts of ethylene, and then processed for product recovery.

The transfer of polymer from the ethylene phase to the water phase may be materially augmented and the centrifugal separation system kept clean by employing in the water jet an effective amount of a surfactant. Any known type of surfactant such as ionic or non-ionic detergents may be employed, which have the property of causing the water to wet the polymer and which can subsequently be removed from the polymer by the use of solvents or water washing so that product quality is not impaired. Specific examples of such surfactants or wetting agents are "Igepal CA" which is a condensation product of ethylene oxide and an alkylated phenol, "Triton X-45" which is of the same general type, "Nacconol" which is a sulfonated product of an alkylated benzene, and "Pluronic L-64" which is a non-ionic wetting agent produced by condensation of ethylene oxide and propylene glycol. We have found, however, that readily distillable wetting agents such as tertiary butyl alcohol and methanol, are highly advantageous since they may be completely removed from the polymer by simple distillation.

With the peroxy dicarbonate catalysts, temperatures below 100° C. and pressures of the order of 5,000 to 15,000 p. s. i., it is important that the reactor effluent contain at least about .5 weight percent of polymer in order that effective transfer of the polymer to the water phase may be obtained and it is important that the polymer concentration be not substantially higher than about 5 percent because at higher polymer concentrations there is a tendency for the polymer to adhere to reactor walls, to bridge in the reactor and to be so viscous that it cannot be withdrawn through the suction line leading to the water jet pump.

The invention will be more clearly understood from the following detailed description of a plant for producing about 1,000 pounds per hour of solid ethylene polymer (herein called polyethylene), and from the annexed drawing which forms a part of this specification and which is a diagrammatic flow sheet illustrating a portion of said plant.

Commercial ethylene is delivered from a source 10 at about 400 p. s. i. g. through line 11 at a rate of about 1215 pounds per hour, is compressed to about 800 p. s. i. g. by compressor 12, and, together with recycled ethylene from line 13 at the same pressure added at the rate of about 515 pounds per hour, is passed through line 14 to a purifier 15 wherein the ethylene is treated to reduce its oxygen content to less than about 10 parts per million by weight. Treatment in purifier 15 preferably is effected by passing the ethylene at a pressure of about 800 p. s. i. g. and at a temperature of about 150 to 200° C. over a bed of reduced copper oxide. The purifier may consist of a bank of deoxygenizer units packed with copper and supplied with preheaters, coolers and silica gel adsorbers. The ethylene may also be treated for removal of sulfur compounds or other contaminants, if such are contained in the charge. Fresh ethylene feed and low pressure ethylene recycle from product recovery as described hereinbelow are refrerred to hereinafter in the specification and claims as external ethylene. The low pressure ethylene recycle is distinct from high pressure recycle ethylene which for all practical purposes forms a part of the reaction cycle and is referred to hereinafter as high pressure recycle ethylene.

The purified external ethylene is then compressed to about 1900 p. s. i. g. in compressor 16 and the heat of compression is removed by cooler 17. It is then further compressed to about 10,000 p. s. i. g. in compressor 18 and cooled to about 40 to 50° C. in cooler 19. The cooled high pressure stream together with about 67,000 pounds per hour of high pressure recycled ethylene from line 20 provides a total ethylene charge of 68,730 pounds per hour to reactor 21.

Catalyst, which in this example is diethyl peroxydicarbonate, is delivered from a source 22 through a line 23 into the top of the said reactor 21 at a rate of about 5 pounds per hour. The catalyst may be delivered in solution in a solvent such as tertiary butanol, neopentane, fluorocarbons, and dimethyl neopentyl carbinol, but any solvent for the catalyst can be employed, provided such solvent is not sufficient in quantity to hinder materially the polymerization reaction. Water can be used, although it tends to hydrolyze the catalyst and consequently aqueous solutions of catalyst should be kept at temperatures below room temperature. If the catalyst is stored and delivered in undiluted form into the reactor, provision also must be made for cooling the catalyst and maintaining it at a temperature below room temperature, to avoid decomposition, and preferably at a temperature of about —60° C.

In this example the defined amounts of charging stock and catalyst are introduced into the top of a cylindrical reactor about 3 feet in diameter and about 60 feet in height, which reactor is maintained at a temperature of about 70 to 75° C. and a pressure of 10,000 p. s. i. g. The defined conditions are designed to give an effluent product containing approximately 1.5% of polymer. In all cases the rate of catalyst introduction and the holding time in the reactor should be correlated to give an effluent stream which can readily be discharged from the reactor through line 24 as a suspension in dense phase ethylene. The solubility of the polymer in dense phase ethylene at 100° C. and 10,000 p. s. i. is below about .5 part by weight per 100 parts of dense phase ethylene and in all cases the amount of polymer in the effluent stream must exceed that which is soluble in the unreacted ethylene. On the other hand, the amount of polymer in the effluent stream must be sufficiently low to prevent accumulation of polymer on reactor walls, plugging of the reactor and/or an increase in viscosity so great that the effluent can not readily be withdrawn from the reactor. With peroxy dicarbonate catalysts and operating temperatures below 100° C., the effluent product should not contain more than about 5 parts by weight of polymer.

Effluent product is withdrawn from reactor 21 through line 24 by jet pump 25, into which water is injected by pump 26 from recycle line 27 and a make-up water source 28, the water being deaerated and preferably containing a surfactant introduced from source 29. In this example the jet pump consists of a high pressure water inlet line 30 terminating in a discharge nozzle 31 which is surrounded by an annular chamber 32 connected to line 24, the discharge end 33 of the annular chamber being disposed in front of the nozzle and tapered to substantially the diameter of the water inlet line. Following the discharge end of the annular conduit there is a cylindrical portion 34 of approximately the diameter of high pressure water line 30 and extending for a length of 2 or 3 diameters after which there is an outwardly tapered section 35 leading to discharge line 36, sections 33, 34 and 35 constituting a diffuser section of the jet pump. In this example the jet pump is designed for a driving ΔP of 1200 p. s. i. and a driven ΔP of 50 p. s. i. and is operated with about 63,000 pounds per hour of a water stream which preferably contains the surfactant. When Igepal is employed, amounts as low as about .1 to .2% are sufficient, but with tertiary butyl alcohol we prefer to employ amounts of the order of 5 to 20%; in other words, the water stream may consist of about 58,000 pounds per hour of water and about 5,000 pounds per hour or more of tertiary butyl alcohol.

The jet pump not only increases the pressure of the reactor effluent but it causes intimate admixture of this effluent with the aqueous stream and enables transfer of the polymer from the dense phase ethylene to the water. The three-phase mixture of water, polymer and dense phase ethylene is introduced by line 36 to cyclone separator 37 in which the dense phase ethylene is effectively separated from the heavier water and polymer so that said dense phase ethylene may be directly recycled through line 20 to the inlet end of the reactor at a rate of 67,000 pounds per hour without the use of a gas compressor, the driving force of the jet pump supplying the necessary pressure for effecting mixing, separation and transfer.

The water stream which may contain surfactant and in which the polymer is now suspended, is withdrawn from cyclone separator 37 through pressure reducing valve 38 and introduced into low pressure separator 39 which in this example is operated at about 800 p. s. i. and a temperature of about 55° C. The ethylene which is released from the aqueous slurry at this lower pressure is withdrawn from the top of separator 39 through line 40 to cyclone separator 41 for removing any entrained water and/or polymer and is then returned to line 13 at the rate of about 515 pounds per hour for admixture with incoming ethylene charge. Separated material from cyclone separator 41 is passed by line 42 (and the pressure reducing valve therein) to the liquid phase in the low pressure separator or to the discharge line 43 (which, likewise, contains a pressure reducing valve) which withdraws said liquid phase to a product separation system 44.

The product separation system (which is only diagrammatically shown in the drawing) is preferably operated at approximately atmospheric pressure and about 215 pounds per hour of ethylene are removed from the slurry at this low pressure through line 45; it may be recycled to source 10. The polymer is filtered from the aqueous stream and the filtrate is recycled through cooler 46 and line 27 to the inlet side of pump 26. By employing injection water at a temperature of about 40 to 45° C., the temperature of the high pressure ethylene, which is recycled through line 20, is reduced to such an extent that no additional cooling means are required for the reactor. In other words, the operating temperature of the reactor may be controlled by controlling the temperature of dense phase ethylene recycled through line 20 and that temperature, in turn, is controlled by the extent to which the circulating water stream is cooled in heat exchanger 46.

After the filtration step, the product polymer may be washed with water to remove surfactant, passed between compression rolls for eliminating most of the water, and dried in a turbo drier. When tertiary butyl alcohol is employed as the surfactant, the alcohol and water may be removed from the product polymer by distillation. The dried polymer product is withdrawn from the product separation system through line 47 at the rate of about 1000 pounds per hour, at which time it may be mixed in a Banbury mixer with a suitable antioxidant or dye, extruded and chopped into desired shapes and sizes and sent to storage.

In the example hereinabove described, the catalyst was added in amounts of the order of 0.3 weight percent based on external ethylene. The amount of catalyst, of course, depends on the composition and the activity thereof but is usually in the range of .001% to about 2% by weight based on external ethylene. The polymerization time, i. e. holding time, in the reactor in this example was of the order of 7 hours based on external ethylene and with different catalysts or conditions this holding time may range from about 10 minutes to as much as 10 hours. The charge in this case was substantially pure ethylene so that the total pressure was approximately equivalent to the ethylene partial pressure; with peroxy dicarbonate catalysts under the specified conditions, the ethylene partial pressure should be at least 1000 p. s. i. and should preferably be about 4,000 to 20,000 p. s. i. or more. The peroxy dicarbonate catalysts have the general formula $$R^1O-\overset{O}{\underset{}{C}}-O-O-\overset{O}{\underset{}{C}}-OR^2$$

in which R¹ and R² are organic radicals, such, for example, as alkyl radicals containing less than 6 carbon atoms. Some peroxy type polymerization catalysts are effective at much higher temperatures and pressures than those required for peroxy dicarbonate catalysts and under said higher temperatures and pressures it may be possible to remove reactor effluent containing substantially more than 5 weight percent of polymer.

For any given catalyst, charge, temperature, and pressure the operator may, in accordance with the above teachings, readily determine the extent of conversion which is possible within the limits required for obtaining a reactor effluent which will flow readily to the jet pump.

It has been discovered that recycled ethylene, i. e. ethylene which has passed through a conversion zone in the presence of diethyl peroxy dicarbonate catalyst, is much more readily polymerizable and results in polymers of greater specific viscosity. Thus, under conditions where fresh ethylene gave only 6.2% conversion to polyethylene, a recycled ethylene gave 13% conversion and produced a product having a viscosity 50% greater than that obtained with fresh ethylene. By recycling at least about 50 parts of ethylene for each part of incoming fresh charge, product quality is thus materially enhanced.

We claim:

1. In a process for polymerizing ethylene to form normally solid polyethylene wherein polymerization is effected in an ethylene phase under a pressure in the range of 4,000 to 20,000 p. s. i. in the presence of a peroxy type catalyst in a reaction vessel, the improved method of operation which comprises withdrawing a suspension of polymer in ethylene from the reaction vessel by pumping the suspension through a discharge zone by injecting a high pressure water jet into the suspension in a downstream direction at a rate and velocity to increase the pressure of said suspension and cause turbulent intermixing of said suspension with said water and to obtain a three-phase mixture of water, ethylene and polymer, centrifugally separating said three-phase mixture to separate ethylene from water and polymer, and returning said separated ethylene to the inlet side of the reactor by pressure imparted by said water jet.

2. The method of claim 1 wherein the water contains an amount of a surfactant effective for enhancing transfer of ethylene polymer from the ethylene phase to the water phase.

3. The method of claim 2 wherein the surfactant is tertiary butyl alcohol.

4. The method of claim 1 which includes the further steps of separating water from polymer, recycling the separated water for use in said water jet, and cooling said recycled water so that it will in turn cool the ethylene which is returned to the reactor and thus control the temperature in the reactor.

5. The method of claim 4 wherein the water contains an amount of surfactant effective to cause wetting of the polymer by the water.

6. The method of claim 1 wherein the catalyst is a peroxy dicarbonate having the general formula

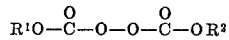

in which R¹ and R² are the same or different alkyl radicals, the polymerization temperature is in the range of about 50 to 100° C., the polymerization pressure is in the range of about 5,000 to 15,000 p. s. i., the amount of catalyst is in the range of .001 to 2% based on external ethylene, the polymerization time is in the range of about 10 minutes to 10 hours and the amount of catalyst and polymerization time are correlated to give a weight percent polymer in polymerization zone effluent in the range of .5 to 5 weight percent.

7. The method of claim 6 in which the amount of catalyst and polymerization time are correlated to give an amount of polymer in the polymerization effluent in the range of 1 to 3 weight percent.

8. A process of polymerizing ethylene to form normally solid polyethylene, the said process comprising the steps of flowing ethylene into a reaction zone under a pressure between about 4,000 and 20,000 pounds per square inch gauge, maintaining the reaction zone at a temperature between about 55° and 100° C., introducing a catalyst into the reaction zone consisting of a diperoxy dicarbonate ester, effecting polymerization of ethylene in the said zone, removing ethylene from the reaction zone after polymerization has continued to the extent that the removed ethylene contains at least about 1 but not more than 5 percent by weight of polyethylene, subjecting the withdrawn polyethylene-containing ethylene to a high velocity jet of water in a downstream direction whereby the pressure on the withdrawn material is increased, intimate mixing is obtained and polyethylene is transferred from the ethylene phase to an aqueous phase, separating ethylene from the said aqueous phase and recycling the ethylene, substantially free of water and at the said increased pressure, to the reaction zone by pressure imparted by said water jet, and recovering polyethylene from the said aqueous phase.

9. The process of making normally solid polyethylene, which process comprises removing impurities from an ethylene charging stock, compressing the purified charging stock to a polymerization pressure of at least about 4,000 p. s. i., cooling the compressed gas to a temperature below 100° C. and introducing the cooled gas into a polymerization zone together with at least about 50 volumes of high pressure recycled ethylene which has been cooled to a temperature below the polymerization temperature, introducing an effective amount of a peroxy dicarbonate polymerization catalyst into the polymerization zone and effecting polymerization in said zone for a time sufficient to produce in the ethylene leaving the reactor an amount of polymer in the range of 1 to 5 weight percent, impinging a water jet in a downstream direction against said polymer-containing ethylene outside of the reactor for increasing the pressure exerted on said polymer-containing ethylene and forming an intimate mixture of ethylene, water and polymer, centrifugally separating said intimate mixture to separate most of the ethylene therefrom and recycling said ethylene by pressure imparted by said jet, passing the water and suspended polymer from the centrifugal separation zone to a lower pressure separation zone for removal of ethylene at lower pressure, compressing said last-named ethylene and combining it with the ethylene charge entering said purification step, separating water and residual ethylene from the slurry leaving said lower pressure separation zone, recycling most of said separated water to said jet and cooling said separated water for in turn cooling the ethylene which is recycled and thus cooling the temperature in the polymerization zone.

10. The method of claim 9 wherein the water contains a wetting agent.

References Cited in the file of this patent

UNITED STATES PATENTS 2,449,489    Larson _____ Sept. 14, 1948
2,475,643    Seebold _____ July 12, 1949